Jan. 4, 1966  A. E. WOELFEL  3,227,171
PILOT VALVE
Filed July 17, 1962
2 Sheets-Sheet 1

Albert E. Woelfel
INVENTOR.

BY Browning, Simmons, Hyer & Eickenroht

ATTORNEYS

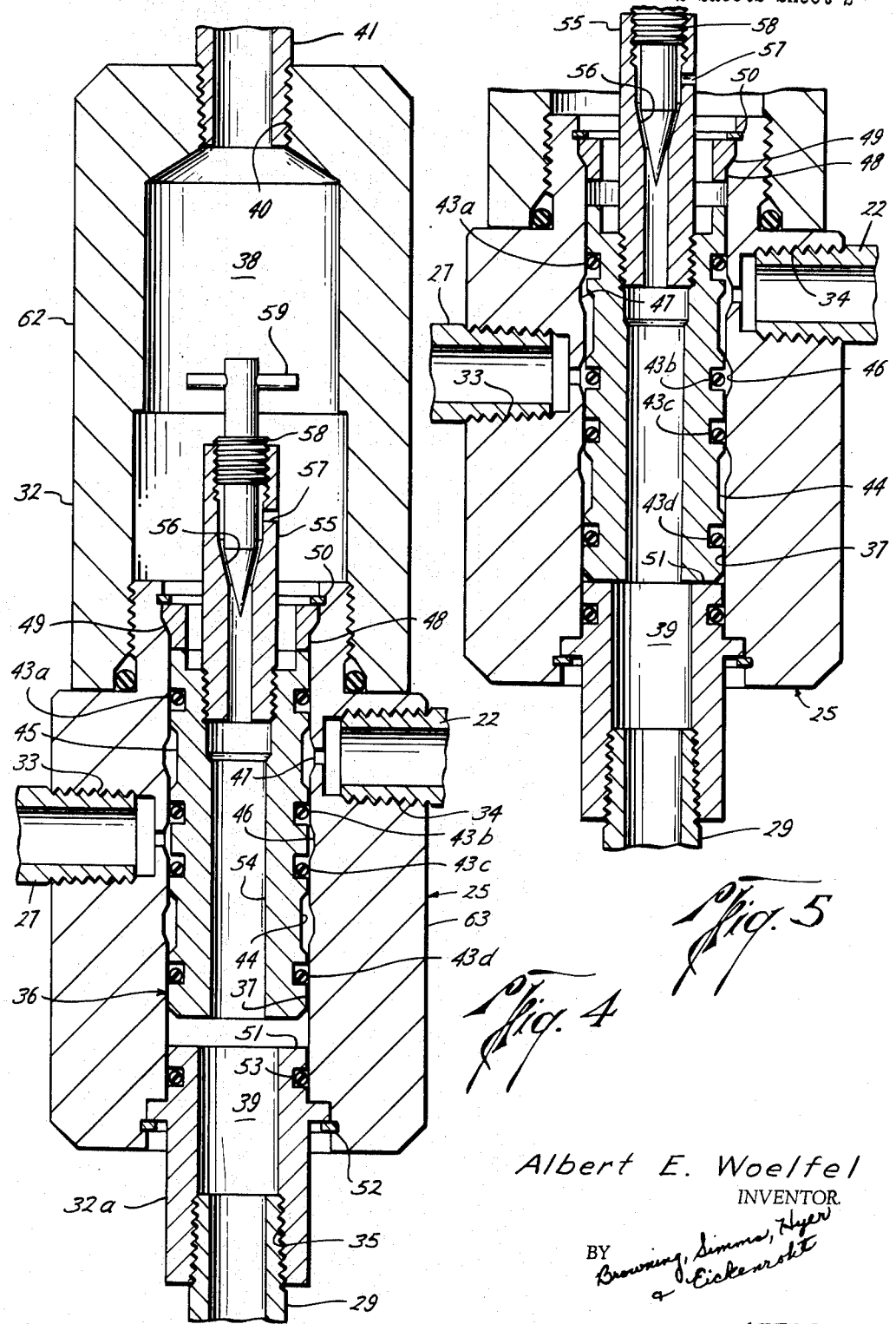

United States Patent Office 3,227,171
Patented Jan. 4, 1966

3,227,171
PILOT VALVE
Albert E. Woelfel, Houston, Tex., assignor to Cameron Iron Works Inc., Houston, Tex., a corporation of Texas
Filed July 17, 1962, Ser. No. 210,351
10 Claims. (Cl. 137—87)

This invention relates in general to apparatus for operating a valve or other mechanism automatically in response to predetermined changes in the pressure of a sensing fluid, such as the fluid in the line in which the mechanism is disposed. More particularly, it relates to an improved pilot valve for use in supplying pressure fluid to an operator for actuating the valve or other mechanism responsive to such changes.

For example, apparatus has been devised for automatically operating a valve to close a line in the event of a break in the line. For this purpose, the apparatus is responsive to the rapid rate of pressure drop in the line fluid for conducting pressure fluid to the operator from a suitable source, which may be the line fluid or an accumulator. However, such apparatus is extremely complex and employs numerous parts which, in addition to making the apparatus expensive, necessitate frequent repairs.

It is an object of this invention to provide a pilot valve which may replace much of this or similar apparatus.

Another object is to provide such a pilot valve which is of simple and inexpensive construction in that it contains a minimum number of parts and wherein the parts which are provided require a negligible amount of maintenance and repair.

A further object is to provide a pilot valve of the type above described having a means for adjusting the rate of pressure change to which the apparatus is responsive with a minimum of time and effort.

These and other objects are accomplished, in accordance with the present invention, by a pilot valve which is in and of itself responsive to a rapid rate of change in sensing pressure for connecting or disconnecting a source of fluid pressure with the operator adapted to be actuated by such fluid pressure. For purposes of illustration only, the mechanism to be operated is similar to that above described in that it comprises a valve in the line which is adapted to be closed in the event of a break in the line, and the pilot valve is responsive to a rapid rate of drop in the line pressure, which would occur upon such a break, for communicating the fluid pressure with the operator.

The pilot valve comprises a body having an inlet and an outlet and a port for connection with a sensing fluid, which in this case is line pressure. The source of pressure fluid may be connected with the inlet, the outlet may be connected with the operator, and means are provided for connecting the inlet and outlet in response to a predetermined rate of pressure change—in this case a drop—in the line pressure. Thus, the valve body is hollow and a valve member is movable therein responsive to such drop from a closed position in which it disconnects the inlet and outlet to an open position in which it connects them.

More particularly, the valve member is sealably slidable within the hollow body to divide it into a dome and a pressure chamber for connection with the port, and an orifice connects the dome with the pressure chamber for normally equalizing the pressure across the valve member. However, when line pressure drops at a rate more rapid than the rate at which dome pressure may bleed through the orifice, the resulting force will urge the valve member from closed to open position so as to connect the inlet and outlet.

In a preferred form of the pilot valve, the orifice is disposed in the valve member. Also, the pilot valve preferably includes means for adjusting the size of the orifice so as to thereby adjust the rate of pressure drop to which the valve member is responsive. In any case, the valve comprises only two basic parts—a body and valve member—and is devoid of diaphragms, auxiliary pistons, and like parts which frequently require repair and replacement.

FIG. 4 is a detailed sectional view of the pilot valve in closed position; and

FIG. 5 is a view similar to FIG. 4, but with the pilot valve in open position.

Figure 1:
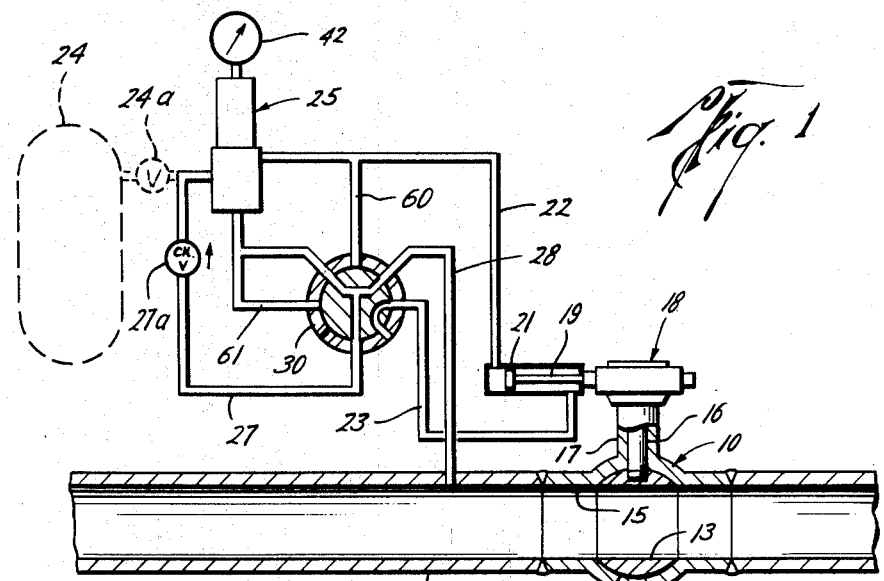
FIG. 1 is a diagrammatic view of a line having a valve disposed therein for controlling same and apparatus including a pilot valve constructed in accordance with the present invention for operating the valve to close the line in response to a rapid drop in line pressure.
Figure 2:
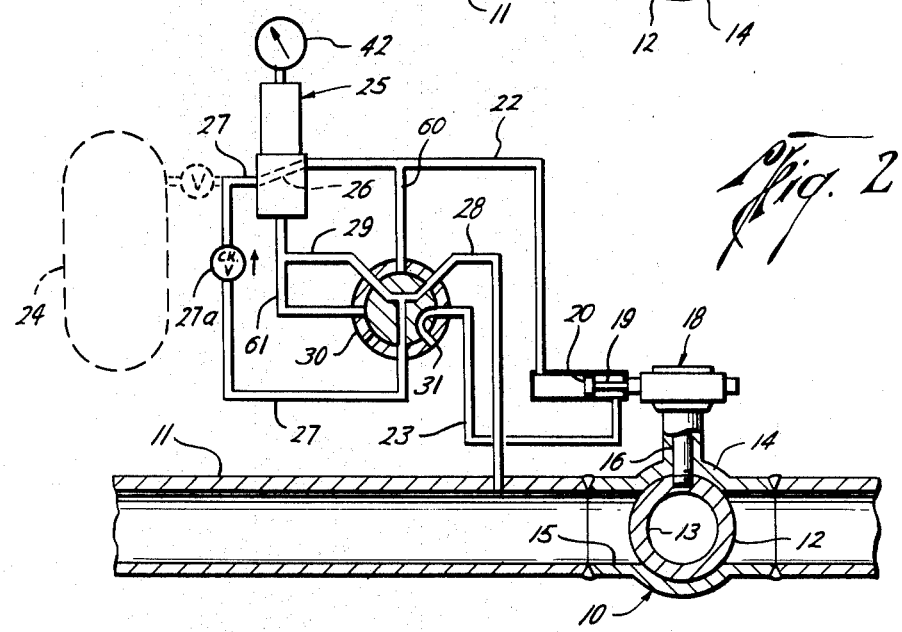
FIG. 2 is a view similar to FIG. 1, but with the operator moved to a position closing the line valve in response to the shifting of the pilot valve from a closed position disconnecting the source of pressure fluid with the operator to an open position connecting them.

With reference now to the details of FIGS. 1 and 2, the valve 10 disposed in the line 11 includes a ball-shaped valve member 12 having an opening 13 therethrough and rotatable within the valve body 14 between the position of FIG. 1, in which the opening 13 is aligned with the flowway 15 through the valve body to open the valve, and the position of FIG. 2, in which the opening 13 is disposed transversely of the flowway for closing the valve and thus the line 11.

The valve member 12 is turned between opened and closed positions by means of a stem 16 which extends upwardly from the top of the valve member and through a neck 17 on the valve body for connection to the valve operator 18. This operator may be of any well known construction (not shown) such as a pinion on the stem adapted to be rotated 90° in response to reciprocation of a rack on the rod 19 extending therefrom. As shown in FIGS. 1 and 2, the rod is connected to a piston 20 reciprocable within cylinder 21 in response to pressure fluid introduced into the cylinder through conduits 22 and 23 connected thereto on opposite sides of the piston. Thus, such fluid is admitted to the left-hand side of the piston 20 through the conduit 22 and exhausted from the right-hand of the piston through conduit 23 in order to move the rod 19 from left to right and thereby turn the valve member from opened to closed position. On the other hand, pressure fluid is admitted through conduit 23 and exhausted through conduit 22 in order to shift the rod from right to left and thereby move the valve member from closed to opened position.

This fluid pressure for actuating the operator to close the valve 10 may be supplied to the conduit 22 from any suitable source, such as the line 11 or the gas accumulator 24 shown in broken lines in FIGS. 1 and 2. As will be described more fully hereinafter in connection with FIGS. 4 and 5, a pilot valve 25 disposed between the conduit 22 and a conduit 27 leading from the line or the accumulator is movable from a closed position to the open position indicated by broken lines 26 in FIG. 2 for communicating fluid pressure from either source with the operator to close the valve.

As previously mentioned, the pilot valve is movable from closed to open position in response to a rapid drop in the pressure of the line fluid conducted thereto by means of a conduit 28 leading from the line and connected with conduit 29 leading to the lower end of the pilot valve by means of a selector valve 30. As can be seen from FIGS. 1 and 2, with the selector valve turned to a position for so connecting the conduits 28 and 29, the conduit 23 connecting with the right-hand side of operator piston 20 is vented to the atmosphere through a port 31 in the body of the selector, and high pressure fluid from either the line or the accumulator is free to move through the open pilot valve 25 to the left side of piston 20 for moving it from left to right to close the valve 10.

As shown in FIGS. 4 and 5, the pilot valve 25 comprises a hollow valve body 32 having an inlet 33 thereto which receives the conduit 27 and an outlet 34 therefrom which receives the conduit 22. There is a port 35 in the lower end of a tubular extension 32a of the body to receive the conduit 29, and a spool-type valve member 36 is sealably slidable within an intermediate cylindrical portion 37 of the hollow body to divide the body into an upper dome 38 and a lower pressure chamber 39. There is a port 40 in the upper end of the dome to receive the stem 41 of a gage 42 (see FIGS. 1 and 2) to provide a visual indication of the pressure within the dome.

There are a plurality of rings 43a, 43b, 43c and 43d surrounding the body 44 of the valve member in longitudinally spaced-apart relation and sealably slidable within the valve body portion 37 to disconnect the inlet 33 and outlet 34, and thus the conduits 27 and 22, in the uppermost position of the valve member shown in FIG. 4. On the other hand, when the valve member is moved to the lowermost position shown in FIG. 5, the seal rings are disposed to connect the inlet and outlet of the pilot valve and thereby communicate the accumulator or line pressure with the line valve operator.

More particularly, the uppermost seal ring 43a is separated from the next lower seal ring 43b by means of an annular recess 45 about the valve member body 44, and in the uppermost closed position of the valve member, the ring 43b is sealably engageable with the portion 37 of the hollow body above the inlet 33 but below the outlet 34 so as to disconnect the two. However, when the valve member is moved downwardly to the open position of FIG. 5, seal ring 43b moves beneath a recess 46 in the body portion 37 adjacent the port 33, while the uppermost seal ring 43a remains in sealing engagement with the body portion 37 above a recess 47 about such body portion adjacent the port 34. Thus, as can be seen from FIG. 5, gas from the line or accumulator is permitted to pass from the inlet 33 to the outlet 34 and thence to the line valve operator.

The valve member 36 is located in the uppermost closed position by engagement of its upper end with an annular seat 48 held down upon shoulder 49 on the upper end of portion 37 of the valve body by means of snap ring 50. The valve member is located in its lowermost position by engagement at its lower end with the upper end 51 of the tubular extension 32a of the valve body, which in turn is releasably held in position within portion 37 of the body by means of a snap ring 52. An O-ring 53 or the like is received about the outer surface of extension 32a to seal with respect to body portion 37.

The body 44 of the valve member 36 has an opening 54 extending longitudinally through it and connected at its upper end to a tubular extension 55. As shown in FIGS. 4 and 5, the extension has a tapered seat 56 intermediate its lower end and a side port 57 connecting its interior with the dome 38. The opening through the tubular extension is restricted by means of a needle valve 58 to form an orifice connecting the pressure chamber 39 with the dome 38. More particularly, the needle valve 58 may be rotated by means of the handle 59 at its upper end so as to selectively make the orifice larger or smaller.

Of course, this orifice normally balances the pressure across the valve member 36 so that the frictional engagement of the seal rings about the valve body portion 44 with the valve body portion 37 will hold the valve member in its upper position. The valve member will remain in such position even when there is a drop in pressure in the line as long as the rate of such drop is not greater than the rate at which fluid can bleed down through the orifice from the dome 38. However, when the rate of line pressure drop becomes sufficiently greater to overcome the aforementioned frictional engagement of the seal rings, the pressure differential across the valve member will move it down to open position. Obviously, the rate of pressure drop in the line fluid which will effect movement of the valve member 36 is dependent upon the size of the orifice, so that the orifice may be made smaller to make the valve member responsive to a lower rate of pressure drop and larger to prevent the valve member from moving to the open position of FIG. 5 until the rate of pressure drop is greater. In this manner, the size of the orifice may be adjusted to cause the pilot valve to be sensitive only to breaks in the line, and not to pressure drops in the line resulting from its normal functions.

Reviewing the over-all operation of the pilot valve, it will be understood that in the embodiment illustrated, the valve will remain in the closed position of FIG. 4 when the line pressure is increasing either at a high or low rate. Also, of course, when the line pressure is steady so that there is substantially no pressure differential across opposite sides of the valve member 36, the valve member is held in the uppermost closed position by its frictional engagement within the hollow valve body portion 37. Also, when line pressure is dropping slowly, fluid is able to bleed from the dome 38 into the pressure chamber 39 sufficiently rapidly to maintain a substantial pressure balance across the valve member so that the valve member remains in its uppermost closed position. However, when line pressure drops rapidly and the orifice is so adjusted that dome pressure cannot bleed off as rapidly as the line pressure drops, the pressure differential acting downwardly in the valve member will shift it to the open position of FIG. 5.

As previously described, the fluid for operating the line valve may come from either the line or the accumulator 24. When the latter source is used, the lower portion of conduit 27 may be eliminated from the apparatus. However, in the event such conduit is in place for alternative use or for charging the accumulator with line fluid, a check valve 27a is disposed therein to prevent accumulator pressure from entering the system other than through the pilot valve 25.

Figure 3:
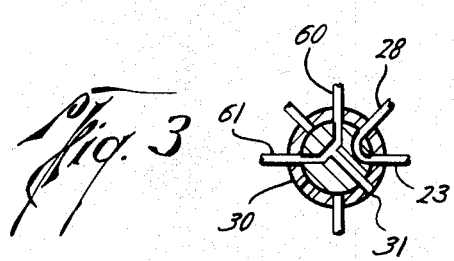
FIG. 3 is a view of the selector valve of such apparatus turned to a position for resetting or shifting the pilot valve back to closed position.

When the line valve 10 has been closed, and it is desired to open the line valve and reset the pilot valve, the selector valve 30 is turned to the position shown in FIG. 3 wherein the conduit 28 leading from the line 11 is connected with the conduit 23 connecting with the right-hand side of operator piston 20. At the same time, conduit 22 connecting with the left-hand side of the operator piston is vented through conduit 60 to port 31 in the selector valve, and the pressure chamber 39 in the lower end of the pilot valve 25 is also vented to port 31 through conduit 61 so as to permit the dome pressure to bleed down to atmospheric pressure. Of course, if the accumulator 24 is being used, the valve 24a at its outlet is closed to prevent the loss of pressure fluid therefrom.

The higher pressure of the line fluid thus urges the operator piston 20 to the left-hand position to reopen the valve member 12. The selector valve is then returned to the position shown in FIGS. 1 and 2 to admit line fluid to the pressure chamber 39 through the conduit 29. The resulting pressure differential across the valve member 36 moves it upwardly to reset the pilot valve in the closed position of FIG. 4 since the orifice through the valve member works in reverse by virtue of the fact that pressure within the chamber 39 cannot bleed down to the pressure of dome 38 as fast as the increase in pressure in the chamber 39 resulting from the admission thereto of line fluid.

As shown in FIGS. 4 and 5, the valve body 32 is made up of upper and lower threadedly connected parts 62 and 63, respectively. The lower body part provides the polished surface of body portion 37 in which the valve member 36 reciprocates, and the upper body part 62 encloses the dome 38 above the upper end of the valve member 36. Obviously, upon disconnection of the part 62 from the part 63, the operator has access to the needle valve 58, whereby he can adjust the size of the orifice through the tubular extension 55. The separate body parts 62 and 63 also permit the assembly of seat 49 as well as the snap ring 50 so as to locate and position the valve member 36 which is inserted into part 63 from its lower end. Upon insertion of the valve member 36, the tubular extension 32a may be moved into place and held there by means of snap ring 52.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in accompanying drawings is to be interpreted as illustrative and not in a limiting sense.

The invention having been described, what is claimed is:

1. A pilot valve, comprising a body having an inlet and an outlet and a port for connection with a sensing fluid, and means for alternately connecting and disconnecting the inlet and outlet in response to a predetermined rate of change in pressure of the sensing fluid and preventing communication between the sensing fluid port and each of said inlet and outlet during both connection and disconnection of the inlet and outlet.

2. A pilot valve, comprising a hollow body having an inlet thereto and an outlet therefrom, a port in the body for connection with a sensing fluid, and a valve member within the body responsive to a predetermined rate of change in pressure of the sensing fluid for movement between positions connecting and disconnecting the inlet and outlet, said valve member blocking communication between the sensing fluid port and each of said inlet and outlet in both of said positions.

3. A pilot valve, comprising a hollow body having an inlet thereto and an outlet therefrom, a valve member within the body forming part of a pressure chamber therein which is isolated from each of said inlet and outlet, and means for reciprocating the valve member between a position disconnecting the inlet and outlet to a position connecting them upon a predetermined rate of change in pressure of the fluid within the chamber.

4. A pilot valve, comprising a hollow body having a valve member reciprocable therein between alternate positions and a pressure chamber on one side of the valve member, an inlet to and outlet from the valve body, seal means between the valve member and valve body isolating said pressure chamber from each of the inlet and outlet, means on the valve member disconnecting the inlet from the outlet in a first alternate position and connecting them in a second alternate position, and means including a port in the body connecting with the pressure chamber for moving said valve member from the first position to the second position in response to a predetermined rate of drop in the pressure of the fluid within said chamber.

5. A pilot valve, comprising a hollow body having an inlet thereto and outlet therefrom, a valve member sealably slidable within the body to divide it into a dome on one end of the valve member and a pressure chamber on the other end of the valve member, each of said pressure chamber and dome being isolated from each of the inlet and outlet, means on the valve member for connecting and disconnecting the inlet and outlet in alternate positions thereof, a port into said pressure chamber, and a restricted orifice connecting the pressure chamber with the dome.

6. A pilot valve of the character defined in claim 5, wherein said orifice is disposed within the valve member.

7. A pilot valve of the character defined in claim 5, including means for adjusting the size of said orifice.

8. Apparatus for operating a valve in a line, comprising a reservoir for pressure fluid, means connecting the reservoir with an operator for the valve, valve means for opening and closing said connecting means, and means including a fluid connection between said valve means and said line for moving said valve means between opened and closed positions in response to a predetermined rate of change in the pressure of line fluid while preventing said pressure fluid from flowing into said line throughout the range of movement of said valve means.

9. Apparatus for operating a valve in a line, comprising a body having an inlet and an outlet, means connecting the outlet with an operator for the valve, a port in said body, means connecting a source of pressure fluid with said inlet and the port with said line, and valve means within said body movable in response to a predetermined rate of change in the pressure of fluid in said line for alternately connecting and disconnecting the inlet and outlet while preventing flow from said inlet to said port during both connection and disconnection of said inlet and outlet.

10. Apparatus for operating a valve in a line, comprising a hollow body having an inlet thereto and outlet therefrom, a valve member sealably slidable within the body to divide it into a dome on one side of the valve member and a pressure chamber on the other side thereof, each of the pressure chamber and dome being isolated from the inlet and outlet, means on the valve member for connecting and disconnecting the inlet and outlet in alternate positions thereof, a port into said pressure chamber, a restricted orifice connecting the pressure chamber with the dome, means connecting the outlet with an operator for the valve, and means connecting a source of pressure fluid with the inlet and the port with said line.

References Cited by the Examiner
UNITED STATES PATENTS

| | | | |
|---|---|---|---|
| 1,893,462 | 1/1933 | Wait | 137—488 |
| 2,780,242 | 2/1957 | Dyson | 251—63 XR |
| 2,871,876 | 2/1959 | Edmund | 137—464 |
| 3,043,331 | 7/1962 | Peters | 137—492 XR |

M. CARY NELSON, *Primary Examiner.*

MARTIN P. SCHWADRON, *Examiner.*